United States Patent [19]

Crabtree

[11] Patent Number: 4,668,320
[45] Date of Patent: May 26, 1987

[54] METHOD OF MAKING A COILED ELECTRODE ASSEMBLY

[75] Inventor: Grace Y. Crabtree, Cleveland, Ohio

[73] Assignee: Union Carbide Corporation, Danbury, Conn.

[21] Appl. No.: 698,816

[22] Filed: Feb. 6, 1985

Related U.S. Application Data

[60] Division of Ser. No. 595,367, Mar. 30, 1984, Pat. No. 4,539,271, which is a continuation-in-part of Ser. No. 537,566, Sep. 30, 1983, abandoned.

[51] Int. Cl.$^4$ .................... B31C 13/00; B65H 81/00
[52] U.S. Cl. .................... 156/192; 156/227; 156/299; 156/300; 156/303.1; 156/308.4; 429/94; 429/139; 429/144
[58] Field of Search ............ 429/94, 136–139, 429/142–144; 156/73.1, 73.4, 184, 191–192, 227, 272.2, 274.4, 275.1, 275.3, 297, 299, 300, 303.1, 308.2, 308.4

[56] References Cited

U.S. PATENT DOCUMENTS

| | | | |
|---|---|---|---|
| 2,870,235 | 6/1959 | Soltis | 136/111 |
| 3,350,239 | 10/1967 | Stanimirovitch | 136/176 |
| 3,442,717 | 5/1969 | Horn | 136/176 |
| 3,558,358 | 1/1971 | Ropp, Jr. | 429/139 |
| 3,892,620 | 7/1975 | Heussy | 156/443 |
| 3,986,917 | 10/1976 | Diaz | 156/217 |
| 4,026,000 | 5/1977 | Anderson | 29/730 |
| 4,152,825 | 5/1979 | Bruneau | 29/623.2 |
| 4,215,186 | 7/1980 | Jaeger | 429/139 |

FOREIGN PATENT DOCUMENTS 160776 12/1980 Japan .

Primary Examiner—Donald E. Czaja
Assistant Examiner—Merrell C. Cashion, Jr.

[57] ABSTRACT

An electrode assembly for use in a galvanic cell has electrodes disposed in superimposed pockets of separator material and end surfaces having a uniform appearance. Also provided is a method for producing such an electrode assembly which method is readily adaptable to high speed automated processes of manufacture.

13 Claims, 11 Drawing Figures

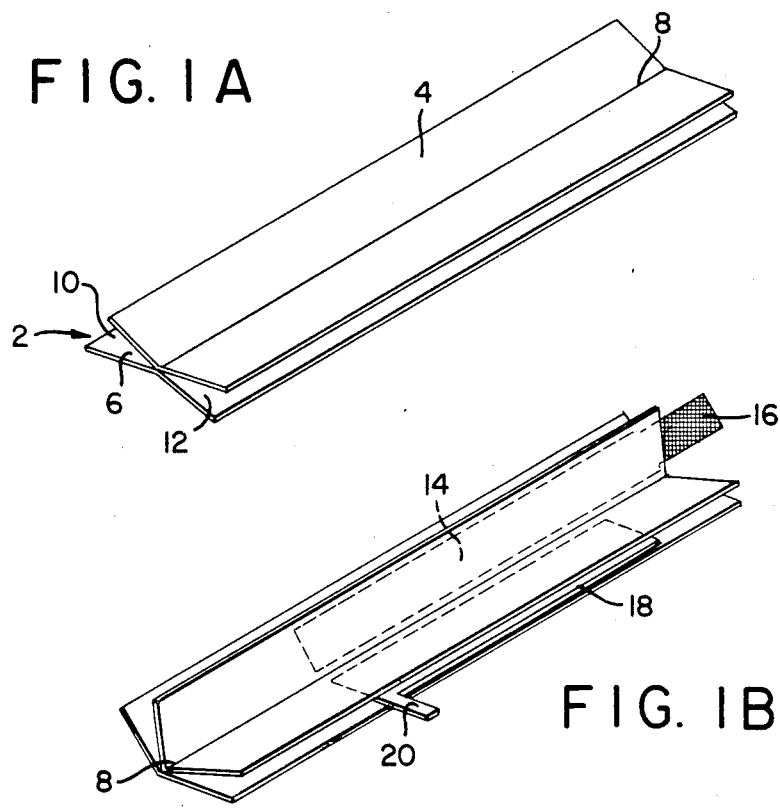
FIG. 1A
FIG. 1B
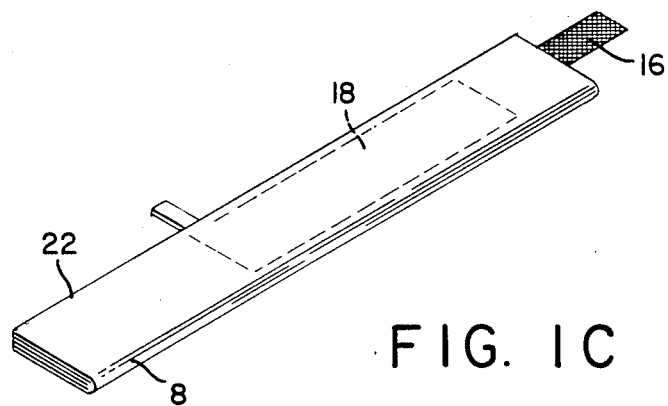
FIG. 1C

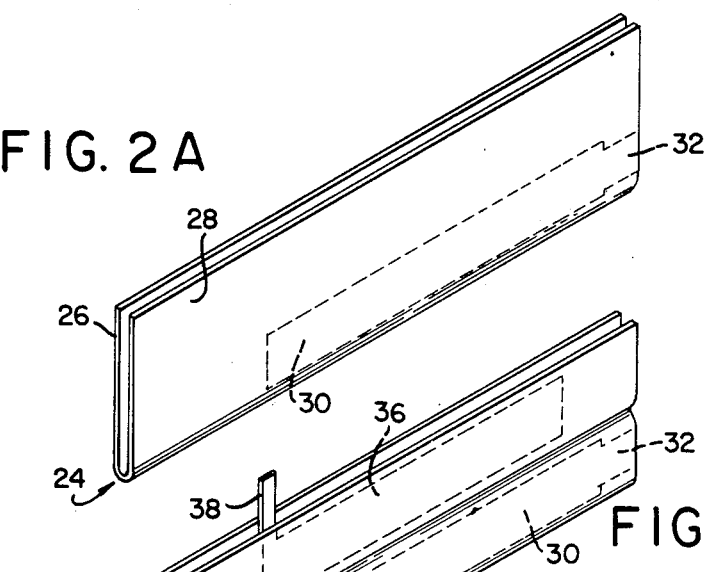
FIG. 2A
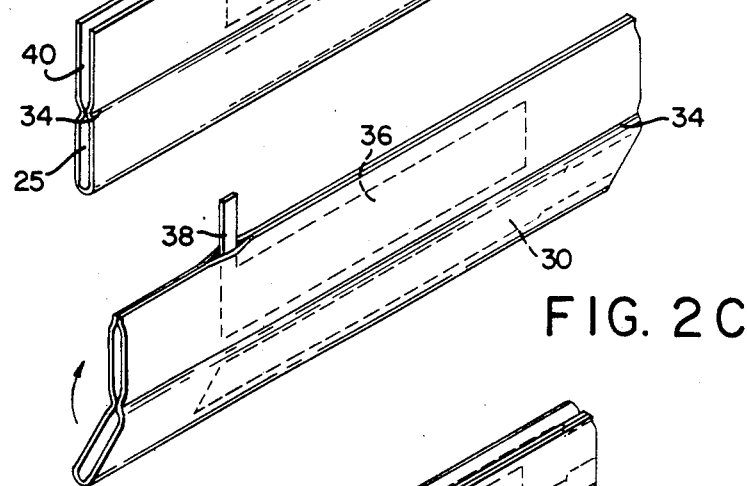
FIG. 2B
FIG. 2C
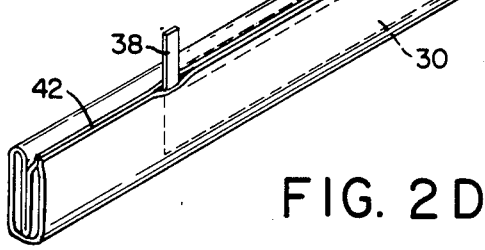
FIG. 2D

METHOD OF MAKING A COILED ELECTRODE ASSEMBLY

This application is a division of prior U.S. application Ser. No. 595,367, filing date 3/30/84, now U.S. Pat. No. 4,539,271, which is a continuation-in-part of application Ser. No. 537,566, filing data 9/30/83, now abandoned.

FIELD OF THE INVENTION

This invention relates to a coiled electrode assembly for use in a galvanic cell which assembly has electrodes disposed in pockets of separator material and end surfaces having a uniform appearance. Accordingly, the amount of scrap associated with the insertion of this electrode assembly into a cell is minimized. In another aspect this invention comprises an improved process for the production of such assembly which process is adaptable to high speed manufacturing techniques.

BACKGROUND OF THE INVENTION

The use of a coiled electrode or "jellyroll" cell configuration is well known in the art of galvanic cell construction. Such configuration involves the coiling of two flat electrodes with a layer of separator material disposed therebetween about a common central axis. The coiled electrode assembly is then typically placed in a cylindrical cell container and electrolyte added, thereby producing a cell having an increased area of surface contact between the anode and cathode relative to comparably sized cells having molded cathodes. This increased surface contact will generally permit cells having such a coiled electrode assembly to operate at higher discharge rates than molded-cathode-containing cells.

In general, two approaches have been taken in the past to produce jellyroll cells. The first of these, typified in Japanese Unexamined Patent Application No. 56-160776, involves encapsulating one of the electrodes (typically the cathode) in separator material prior to the winding of the electrode assembly. This encapsulated electrode is then mated with the cell's other electrode and the two wound together into a coiled configuration.

However, this mating step involves a slow, hand operation. This is because the electrode strips are preferably wound as evenly as is practicable in order to produce a coiled assembly wherein the end surfaces have a generally uniform appearance, thereby simplifying insertion and sealing of the coiled electrode assembly into the cell housing. Should such uniform coiling not be achieved, as is likely when an automated mating process is employed, there is an increased risk of the separator tearing during cell assembly and a corresponding high scrap rate will be incurred. These difficulties become more pronounced in cells for which only a minimum amount of variance in height from that of a perfectly coiled assembly is provided within the cell housing. Thus this problem is more associated with smaller cell sizes wherein it is desirable to have as little wasted volume (i.e. volume not occupied by active cell material) as possible. Consequently, this first approach to providing jellyroll cells is not readily adaptable to producing cells, particularly smaller cells, on a large commercial scale. Moreover, when the cathode is the encapsulated electrode and the anode is composed of a fragile material such as lithium, such anode material may flake off its support (e.g. a metal screen) during cell assembly thereby contaminating the cell assembly apparatus as well as reducing the electrochemical output of the cell produced.

The second general approach adopted in the past, typified by the commercial method of manufacture employed by Union Carbide Corporation for the production of nickel-cadmium cells for at least the last decade, involves a process wherein both electrodes are encapsulated in separator material. More specifically, this process involves placing the electrodes on a first strip of separator material in an end-to-end disposition. A second strip of separator material is then placed congruent to the first strip of separator material and the lengthwise edges of the separator strips sealed together. Alternatively the first strip of separator material is doubled in width and folded in half along its length over the electrodes placed in an end-to-end disposition on such first strip. The open lengthwise edge of such folded separator is sealed, thereby encapsulating the electrodes while said electrodes are still in an end-to-end disposition. In either embodiment, the encapsulated electrodes are then superimposed by folding the separator assembly transversely between the ends of the electrodes. This folded assembly is subsequently wound and inserted into the cell housing. However, it has been observed that this method has the disadvantage that if the central transverse fold is not correct, i.e., if such fold varies more than a few degrees from perpendicular relative to the length of the electrode assembly, the two electrodes may not be adequately aligned. Such poor alignment may create difficulty in the winding operation as well as in the insertion and closing of the wound assembly into the cell housing. As is the case with the first method discussed above, these difficulties are more pronounced during the assembly of cells wherein only a minimum allowance for excess height is provided by the cell housing.

Therefore, it is an object of this invention to provide a method for manufacturing a coiled electrode assembly, which method is readily adaptable to high speed automatic manufacturing techniques.

It is a further object of the invention to provide a method for manufacturing coiled electrode assemblies having ends possessing a uniform appearance thereby reducing the amount of scrap incurred in inserting such assemblies into cells.

It is still another object of this invention to provide a coiled electrode assembly for use in galvanic cells which assembly has ends having a uniform appearance such that said cells which employ such assemblies are less likely to be produced with torn separators.

The foregoing and additional objects will become fully apparent from the following description and the accompanying drawings.

SUMMARY OF THE INVENTION

This invention relates to a coiled electrode assembly for use in a galvanic cell comprising a separator assembly having a first pocket, composed of two superimposed strips of separator material and having an adhereable edge, and a second pocket, composed of two superimposed strips of separator material and having an adherable edge, said second pocket being superimposed over said first pocket such that the adherable edges are aligned with at least a portion of the adherable edges adhered; a first electrode disposed in said first pocket; and a second electrode disposed in said second pocket; said electrode assembly coiled about an axis transverse to the adhered edges such that the adhered edges are in a plane which is normal to the coiling axis.

In another aspect, this invention relates to a method for the manufacture of a coiled electrode assembly for use in galvanic cells comprising the steps:

(a) providing a first separator element having a width and a length and a second separator element having a width and at length;

(b) superimposing said first separator element over said second separator element and adhering the separator elements together along at least a portion of a thin line running along the middle of the widths and parallel to the lengths of the separator elements thereby forming a seam which produces a separator assembly having a first pocket on one side of the seam adapted for receiving a first electrode and a second pocket on the other side of the seam adapted for receiving a second electrode;

(c) folding said separator assembly along said seam such that said first pocket is superimposed over said second pocket; and (d) winding the separator assembly having electrodes inserted in the pockets about an axis transverse to said seam such that said seam is in a plane normal to the winding axis.

In the practice of the method of this invention a first electrode is inserted into the first pocket and a second electrode inserted into the second pocket prior to the coiling of the electrode assembly. Such insertions may each independently occur after step (b) or after step (c) above. Consequently, in some embodiments of this invention step (b') is performed after step (b) and before step (c), step (b') comprising:

(b') inserting a first electrode in said first pocket and a second electrode into said second pocket.

In other embodiments of the method of this invention step (c') is performed after step (c) and before step (d), step (c') comprising:

(c') inserting a first electrode in said first pocket and a second electrode into said second pocket.

Moreover, in still other embodiments of the method of this invention step (b") is performed after step (b) and before step (c) and wherein step (c") is performed after step (c) and before step (d), steps (b") and (c") respectively comprising:

(b") inserting a first electrode into said first pocket;

(c") inserting a second electrode into said second pocket.

As employed herein the term "separator element" may refer to either a distinct piece of separator material, a portion of a distinct piece of separator material, or two or more discontinuous segments of one piece of separator material. Thus in some embodiments the separator assembly of the cell of this invention will comprise a single piece of separator material, the separator elements of which are adhered together, while in other embodiments the separator assembly will be comprised of two or more distinct pieces of separator material which are adhered together. The pieces comprising the separator elements of this invention may have lengths in excess of their widths, widths in excess of their lengths, or equal widths and lengths.

In addition, as employed herein the term "pocket" refers to an enclosure formed by two strips of separator material joined along at least a portion of one aligned edge and adapted for receiving an electrode. The two strips of separator material may be discrete pieces of separator material or of the same piece of separator material. Moreover, in some embodiments of this invention one piece of separator material may form all of one or part of both pockets.

The use of a seamed separator assembly provides a method of electrode assembly manufacture which is readily adaptable to high speed automated techniques. This is because the seam ensures that the pockets containing the electrodes are aligned with one another thereby eliminating the need for hand mating of the electrodes. Moreover, the electrode assembly of this invention is a coil which possesses ends having a uniform appearance and, consequently, is less prone to have a torn separator after insertion into a cell housing. This latter benefit stems from the fact that coiled electrode assemblies having uniform ends do not have extending positions of separator material which are apt to become distorted and torn when subjected to all sealing forces. Thus the scrap rate associated with the incorporation of the electrode assembly of this invention into a cell housing is reduced relative to the rate associated with the insertion of coiled electrode assemblies not possessing uniform ends.

The separator elements may be adhered together to form a seam by any means which will produce a thin line bond which will not fall apart during cell assembly or in the cell environment. Illustrative of the adhering means which may be employed are adhesives, heat sealing, sewing and ultrasonics. This seam may be continuous or discontinuous along the length of the separator assembly. When adhesives are employed they should preferably provide fast bonding and exhibit chemical resistance to the components of the cell coupled with long term stability. Illustrative of the adhesives which may be employed are polyamide hot melts, ultraviolet cured acrylics, epoxies, etc. As will be apparent to one skilled in the art, the preferred adhesive will vary depending upon the composition of the separator elements employed as well as other similar factors.

Most preferably, however, the separator elements are adhered by heat or by ultrasonic means. This is because the heat or ultrasonic treatment forms an indentation running along the seam of the separator assembly, which indentation is convenient for folding the separator assembly.

The piece or pieces of separator material employed in the separator assembly of this invention may be composed of any material which permits ionic transport, maintains physical and chemical integrity in the cell environment, and which is absorbent of and readily wetted by the cell electrolyte. Such materials will be well known to those skilled in the art. When the separator assembly is to be comprised of more than one piece of separator material and when said pieces are to be adhered by the use of heat, at least one of said pieces of separator material must be heat-adherable and the other or others composed of a material receptive to such heat adhering. Preferably, all of the pieces of separator material employed are heat-adherable. Illustrative of the heat-adherable materials which may be employed are microporous polyethylene and microporous polypropylene, the latter being the preferred heat-adherable material.

The electrode assemblies of this invention may be employed in a broad range of galvanic systems such as, for example, nonaqueous cells such as lithium-$MnO_2$ cells, lithium-iron sulfide cells, lithium-polycarbon fluoride cells, as well as aqueous cells such as alkaline- MnO$_2$ cells, nickel-cadmium cells, lead-acid cells, and the like.

The electrode assemblies of this invention are typically preferably constructed as follows. A first rectangular separator element and second rectangular separator element are superimposed and are adhered together along a thin line running midway along the widths and parallel to the lengths of said separator elements thereby forming a separator assembly. This separator assembly comprises two pockets, each of which are adapted for receiving an electrode. These pockets run parallel along the length of the separator assembly with the adhered seam of the separator assembly serving as a divider. The pockets are disposed such that, when the assembly is folded along said seam, electrodes placed in said pockets will overlap one another.

In certain embodiments of the process of this invention a single piece of separator material may be folded such that this single piece of separator material comprises both separator elements. Thus in one embodiment, detailed in FIGS. 2A, 2B, 2C and 2D, a single piece of separator material is first folded into a configuration which is V-shaped in cross-section each wall of such "V" comprising a separator element. Somewhat similarly, in a second embodiment, detailed in FIGS. 3A, 3B and 3C, a single piece separator material is first folded into a configuration such that said piece forms a first separator element and a second separator element comprised of two discontinuous segments of the same piece of separator material.

Once the separator assembly has been formed, said assembly is folded along its seam such that the first pocket is superimposed over the second pocket. The folded separator assembly, with the electrodes inserted therein, is coiled about an axis transverse to the seam, such that the seam is in a plane normal to the coiling axis. The coiled electrode assembly is then encased within a housing to form a galvanic cell. Optionally and preferably however, the open edge of the separator assembly opposite the folded seam of such assembly is adhered prior to the coiling of the electrode assembly.

In certain embodiments of this invention one or both of the electrodes may be placed into the pockets before folding of the assembly, although insertion of the electrodes may be done after such folding. Moreover, as will be apparent to one skilled in the art, connective tabs which provide contact means between the electrodes and their respective terminals in the cell housing may be attached to said electrodes either before or after insertion of the electrodes into the separator assembly. In those embodiments when the tabs are attached after insertion, such attachment may take place before or after the folding of the separator assembly along its seam.

Because the method of this invention provides a seam which runs along the length of the separator assembly, which seam functions as a pivot line during the folding of said separator assembly, the time-consuming step of mating the electrodes by hand is eliminated. Consequently, the method of this invention is readily adaptable to high speed automatic manufacturing techniques.

In addition, because the finished separator assembly has at least one adhered edge, this assembly may be easily coiled such that ends of said coiled assembly have a generally uniform appearance. Consequently, tearing of the separator during cell assembly is reduced along with the difficulty of sealing the cell. Thus the amount of scrap involved in the manufacture of such electrochemical cells is reduced relative to that in commercially employed manufacturing methods.

The present invention will become more apparent from the following description thereof when considered together with the accompanying drawings which are set forth as being exemplary of embodiments of the present invention and are not intended to be in any way limitative thereof.

BRIEF DESCRIPTION OF THE DRAWINGS

FIGS. 1A, 1B and 1C detail a particularly preferred embodiment of the method of the present invention.

FIGS. 2A, 2B, 2C and 2D detail a preferred embodiment of the method of the present invention.

DETAILED DESCRIPTION OF THE DRAWINGS

Figure 3A:
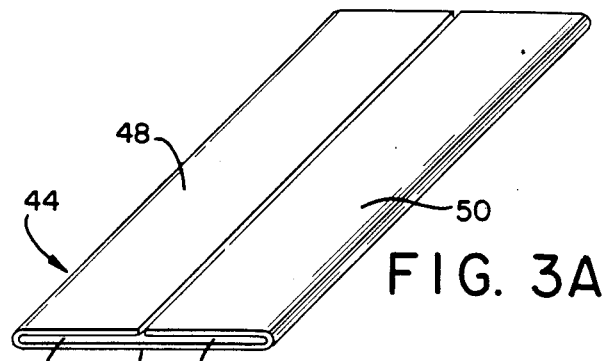
FIGS. 3A, 3B and 3C detail another preferred embodiment of the present invention.

Referring now to FIG. 1A there is shown a separator assembly 2 formed by superimposing first separator element 4 and second separator element 6 and adhering such elements together along their length to form central seam 8. This seam runs along the middle of the widths and is parallel to the lengths of separator elements 4 and 6. It is to be noted that in this embodiment first separator element 4 and second separator element 6 each respectively comprise a distinct piece of separator material. Consequently in this particular embodiment separator elements composed of different materials may be employed. As is apparent from the description of this first embodiment, first separator element 4 will be folded between the two electrodes; whereas, second separator element 6 will be positioned about the exterior of said electrodes. Preferably seam 8 is formed by the application of heat. Formed by such adhering process is first pocket 10, adapted to receive a first electrode, and second pocket 12, adapted to receive a second electrode.

FIG. 1B shows the separator assembly of FIG. 1A wherein a first electrode 14 has been inserted into first pocket 10 and a second electrode 18 has been inserted into second pocket 12. Although first electrode tab 16 is shown extending from the end of separator assembly 2, and a second electrode tab 20 is shown extending from the other side of the separator assembly, these connector tabs may each independently be positioned along the side or at either end of the separator assembly as desired. Although tab 16 is shown extending from the separator assembly in FIG. 1B, said tab need not initially extend beyond said assembly prior to winding because said tab will so extend during the winding process, as will be apparent to one skilled in the art.

FIG. 1C shows the separator assembly of FIG. 1B after being folded along central seam 8, such that the pockets are superimposed. The folded separator assembly is wound about an axis which is transverse to the seam such that the seam is in a plane which is normal to the coiling axis. The coiled electrode assembly may then be inserted into a cell housing. Optionally, the open edge 22 of the folded assembly may be adhered thereby fully encapsulating electrodes 14 and 18. Preferably, such sealing may be accomplished by the application of heat.

FIGS. 2A, 2B, 2C and 2D detail an alternate embodiment of the method of this invention wherein the first separator element and the second separator element comprise a single piece of separator material. As is shown in FIG. 2A, piece of separator material 24 is folded into a configuration which is V-shaped in cross-section, thereby forming first sidewall 26 and second sidewall 28 corresponding to the first separator element and second separator element respectively. These separator elements are superimposed, as shown in FIGS. 2A and 2B, first electrode 30 with first connective tab 32 is inserted into the fold of separator material 24 and is sealed in place in first pocket 25 by adhering first sidewall 26 and second sidewall 28 together along seam 34. This seam runs along the middle of the widths and is parallel to the lengths of separator elements 26 and 28. This seam may be formed by application of heat, ultrasonics, adhesive, stitching or other means.

Second electrode 36 with second extending tab 38 is placed into second pocket 40. The separator assembly is then folded along seam 34 (as shown in FIG. 2C) so that second electrode 36 is superimposed over first electrode 30. The folded separator assembly is wound about an axis transverse to the seam and is inserted into a cell housing. Optionally, open edge 42 of said assembly may be adhered prior to winding of the assembly.

Figure 3B:
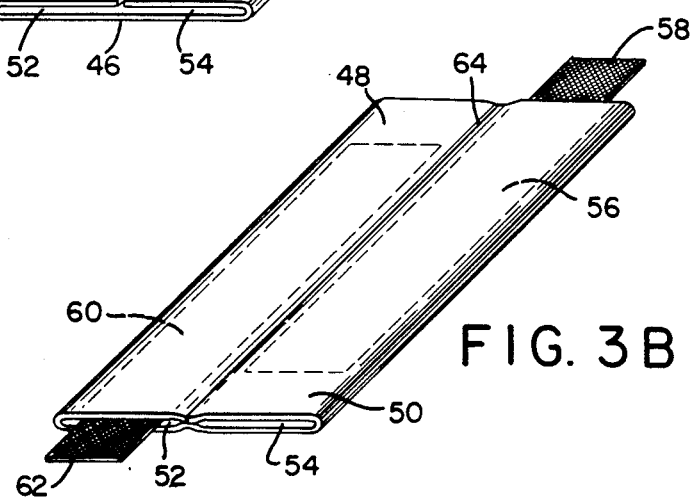
Figure 3C:
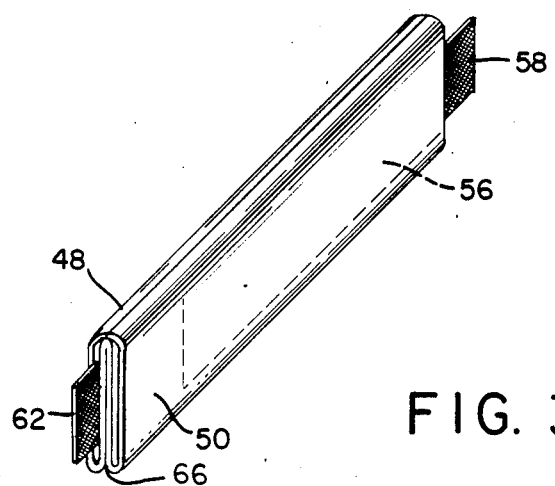

FIGS. 3A, 3B and 3C show another embodiment of the method of this invention wherein the first separator element and the second separator element comprise a single piece of separator material. As is shown in FIG. 3A piece of separator material 44 is folded such that upper walls 48 and 50, which correspond to the second separator element, are superimposed side-by-side over lower wall 46, which corresponds to the first separator element, in a position such that the lengthwise edges of upper walls 48 and 50 are positioned along the center line extending longitudinally along lower wall 46. First pocket 52 is defined by lower wall 46 and upper wall 48 while second pocket 54 is defined by lower wall 46 and upper wall 50.

As is shown in FIG. 3B, first electrode 56 with first conductive tab 58 is inserted into second pocket 54 while second electrode 60 with second conductive tab 62 is inserted into first pocket 52. The lengthwise edges of the two upper walls 48 and 50, i.e. the middle of the width of the second separator element, are then adhered to the middle of the width of the first separator element 46 to form seam 64, which runs parallel to the lengths of the separator elements, as is shown in FIG. 3B. The separator assembly so produced may be folded in either direction along seam 64 so that first electrode 56 is superimposed over second electrode 60. Optionally, the open lengthwise edges 66 of the separator assembly may be adhered together prior to winding and insertion of the assembly into the cell container.

Figure 4:
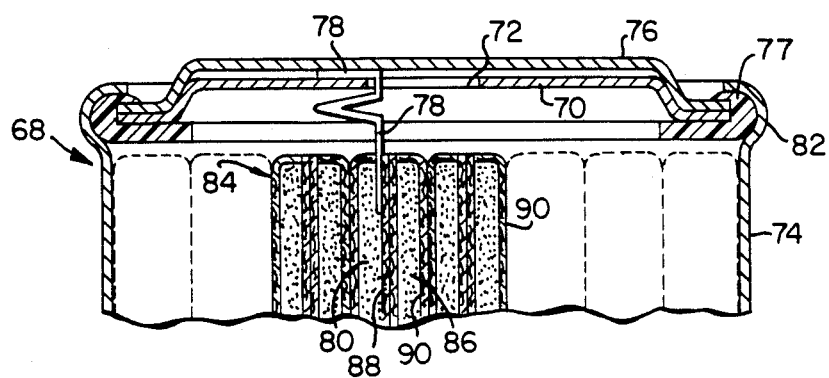
FIG. 4 is a partial sectional view of a cell of this invention employing a separator assembly of the type produced in accordance with the method detailed in FIG. 1.

There is shown in FIG. 4 a partial side elevational view of an assembled cell identified by reference number 68 in accordance with one embodiment of this invention.

The cover assembly comprises an inner cover 70 having an aperture 72 in the center thereof through which air had been evacuated and through which electrolyte had been dispensed into the container 74, and an outer cover 76 which is capable of withstanding cell sealing forces without detrimentally deforming. A conductive tab 78 is attached to first electrode 80 and is secured in electrical contact with inner cover 70. As will be apparent to one skilled in the art, other means of making electrical contact between the electrodes and the cell container may be employed. A sealing gasket 77 is compressively disposed between the container sidewall 82 and the peripheries of covers 70 and 76.

Disposed inside container 74 is coiled electrode assembly 84 comprised of spirally wound first electrode 80, which is disposed within a first pocket formed by first strip of separator material (a portion of first separator element 88) which is superimposed over a second strip of separator material (a portion of second separator element 90); and second electrode 86, which is disposed in a second pocket formed by other superimposed portions of first separator element 88 and second separator element 90. These separator elements may be composed of the same or of different materials, as desired. As is seen in FIG. 1C, the first and second pockets are adhered along an aligned edge of each (identified by number 8). The electrode assembly 84 is coiled about an axis which is transverse to said adhered aligned edges, such that said aligned edges are in a plane which is normal to the coiling axis.

EXAMPLES

The following examples serve to give specific illustrations of the practice of this invention but are not intended in any way to limit the scope of this invention.

EXAMPLE 1

Two hundred galvanic cells were constructed as follows. Two nonwoven polypropylene separators, each measuring about 12.7 cm in length, about 3.0 cm in width, and about 0.025 mm in thickness were superimposed and heat-attached along a seam running along the middle of their widths and parallel to their lengths by means of a soldering iron. An anode member, comprised of lithium pressed on an expanded stainless steel carrier, which anode member measured about 8.6 cm in length and about 0.7 cm in width was inserted into one of the pockets defined by the heat-attached separators. A cathode member comprising a manganese dioxide cathode mix pressed onto a stainless steel screen, said cathode member measuring about 10.8 cm in length and about 0.8 cm in width, was inserted into the opposing pocket. The electrode assembly so produced was folded along the central seam. The open length of the separator assembly was then heat-sealed. This folded assembly was then coiled about an axis tranverse to the seam and placed into a cylindrical cell container which measured about 1.14 cm in diameter and about 1.06 cm in height. A nonaqueous electrolyte was added and the cell sealed by conventional means. Utilizing this embodiment of the method of this invention it was found that the handling and winding of the completed electrode assembly was more rapid and produced cells of comparable quality to cells produced by a conventional manufacturing process wherein only the cathode was encapsulated.

EXAMPLE 2

Fifty cells were produced as follows. A polypropylene separator which measured about 12.7 cm in length, about 4.5 cm in width and about 0.025 mm in thickness was folded in half along its length forming a configuration which was V-shaped in cross-section. An anode, composed of lithium pressed onto an expanded stainless steel carrier, which anode member measured about 8.6 cm in length and about 0.7 cm in width, was inserted into the V-shaped fold and was encapsulated into said assembly by heat sealing the walls of said assembly together along a seam running along the middle of the widths and parallel to the lengths of such sidewalls/separator elements. A cathode member composed of manganese dioxide, which cathode member measured about 10.8 cm in length and about 0.8 cm in width, was placed into said assembly and encapsulated in place by heat sealing the open longitudinal edge of the separator assembly. The assembly was folded along the central seam. The folded assembly was coiled about an axis transverse to the seam and inserted into a cylindrical steel container measuring about 1.14 cm in diameter and about 1.06 cm in height. Electrolyte was added and the cell was sealed. Utilizing this method of this invention it was found that the handling and winding of the completed separator assembly was more rapid and produced cells of comparable quality to cells produced by a conventional manufacturing process wherein only the cathode was encapsulated.

What is claimed is:

1. A method for the manufacture of a coiled electrode assembly for use in a galvanic cell comprising the steps:
   (a) providing a first elongated separator element having a width and length and a second elongated separator element having a width and a length, the length of said elements being greater than the width thereof;
   (b) superimposing said first separator element over said second separator element and adhering the separator elements together along at least a portion of a thin line running along the middle of the widths and parallel to the lengths of the separator elements thereby forming an elongated seam extending the length of said elements and which separates a first pocket on one side of the seam extending the length of said elements and adapted for receiving a first electrode and a second pocket on the other side of the seam extending the length of said elements and adapted for receiving a second electrode;
   (c) folding said separator assembly along said elongated seam such that said first pocket is superimposed over said second pocket;
   (d) inserting a first electrode into said first pocket;
   (e) inserting a second electrode into said second pocket; and
   (f) winding the separator assembly having electrodes inserted in the pockets about an axis transverse to said seam such that said seam is in a plane normal to the winding axis.

2. The method of claim 1 wherein steps (d) and (e) are performed after step (b) and before step (c).

3. The method of claim 1 wherein step (d) is performed after step (b) and before step (c) and wherein step (e) is performed after step (c) and before step (f).

4. The method of claim 1 wherein the first separator element and the second separator element provided in step (a) comprise a distinct first piece of separator material and a distinct second piece of separator material respectively.

5. The method of claim 4 wherein said first piece of separator material and said second piece of separator material are of equal width.

6. The method of claim 5 wherein said first piece of separator material and said second piece of separator material are composed of different materials.

7. The method of claim 4 wherein the first piece of separator material and second piece of separator material are adhered by heat.

8. The method of claim 7 wherein at least one of the pieces of separator material is composed of porous polypropylene.

9. The method of claim 1 wherein the first separator element and the second separator element provided in step (a) comprise a single piece of separator material.

10. The method of claim 9 wherein the piece of separator material is folded in half along its length into a configuration which is V-shaped in cross-section having two walls corresponding to the first separator element and the second separator element respectively prior to being adhered in step (b).

11. The method of claim 9 wherein the piece of separator material is folded into a configuration such that two upper walls, corresponding to the second separator element, are positioned side-by-side over a lower wall, corresponding to the first separator element, in a disposition such that the lengthwise edges of said upper walls are along the center of the width and parallel to the length of the lower wall.

12. The method of claim 9 wherein the first separator element and the second separator element are adhered by heat in step (b).

13. The method of claim 12 wherein said piece of separator material is composed of porous polypropylene.

* * * * *